United States Patent Office 3,305,589
Patented Feb. 21, 1967

3,305,589
PROCESS OF PREPARING TERTIARYARYL
PHOSPHINE SULFIDES
William E. Bacon, Kent, Ohio, assignor to The Lubrizol
Corporation, Wickliffe, Ohio, a corporation of Ohio
No Drawing. Filed Oct. 8, 1963, Ser. No. 314,646
13 Claims. (Cl. 260—606.5)

The present invention relates to a novel method of synthesis of certain phosphorus-containing organic compositions in which three carbon atoms are directly attached to phosphorus, and in particular to a method of preparing these organophosphorus compositions utilizing metal halide complexes of a phosphorus-containing reactant.

Compounds which contain phosphorus within their molecular structure are, in general, quite useful as lubricating oil additives. Such compounds, when added in small proportions to a lubricating oil, impart extreme pressure properties and tend to diminish the decomposition and subsequent corrosive properties of such lubricating oil. Consequently, these compounds have been used extensively throughout the broad field of lubrication. Organophosphorus compositions are also useful as additives in hydrocarbon fuels, asphalts, plastics, and paints. The phosphorus-containing compositions obtained by the process of this invention may be prepared by conventional methods, but in low yields and under more sever reaction conditions.

Accordingly, it is an object of this invention to provide an efficient and low cost method of preparing organophosphorus compounds.

Another object is to provide a process for the preparation of phosphorus compounds under mild conditions.

Still another object is to provide a process for the preparation of organophosphorus sulfides.

Still another object of this invention is to provide a process for the preparation of unsymmetrical phosphine sulfides.

These and other objects of the invention are achieved by the process for preparing phosphorus compositions comprising reacting at a temperature within the range from about 50° C. to about 200° C.

(a) a phosphorus-containing reactant selected from the class consisting of the compounds having the formula

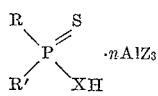

wherein X is selected from the class consisting of oxygen and sulfur;
$n$ is a number from 1 to 2,
Z is a halogen, and
R and R' are hydrocarbon radicals, with (b) an aromatic compound having an ionization constant of less than $1 \times 10^{-10}$ at 25° C. in aqueous solution, in the presence of (c) $AlZ_3$ wherein Z is as defined above.

The hydrocarbon radicals R and R' of the phosphorus-containing reactant are radicals containing preferably from 1 to 30 carbon atoms. These radicals may also contain polar groups provided, however, that the polar groups are not present in proportion sufficiently large to alter significantly the hydrocarbon character of this radical. Such polar groups are exemplified by the chloro, bromo, keto, ether, aldehyde, nitro, etc. groups. Additionally, the hydrocarbon radicals may be the same or different aliphatic cycloaliphatic and/or aromatic radicals.

Examples of hydrocarbon aliphatic radicals include methyl, ethyl, n-propyl, isobutyl, isopropyl, n-butyl, hexyl, cyclohexyl, chloroethyl, nitropropyl, chloro-cyclohexyl, etc.

Examples of aromatic radicals are the organic radicals containing at least 1 resonant ring structure such as, phenyl, naphthyl, tetrahydronaphthyl, anthracyl, phenanthryl, triphenylenyl, biphenyl, and terphenyl radicals, and the substitution products of these such as alkylation products, halogenation products, nitration products, etc. Examples of the alkylation products include tolyl, cresyl, xylyl, mesitylenyl, diethyl phenyl, isopropyl phenyl, tertiary-butyl phenyl, paraffin wax-substituted phenyl, dodecyl phenyl, etc. Examples of the halogenation products include chlorophenyl, dichlorophenyl, bromophenyl, mono- and poly-chloro xenyl, mono- and poly-chloro naphthyl, ethylchlorophenyl, etc. Examples of nitration products include nitro phenyl, nitro xenyl, methyl-nitro phenyl, etc. Although any one of the above aromatic radicals can be utilized, organic radicals containing one resonant ring structure are preferred.

The organic phosphorus-containing reactants useful in the process of this invention as described by the above formula may be phosphinodithioic acids and phosphinomonothioic acids. The phosphinodithioic acids can be prepared by the reaction of Grignard reagents with phosphorus pentasulfide (see Organophosphorus Compounds, G. M. Kosolapoff, p. 135, John Wiley and Sons, New York, 1950). The di-aromatic phosphinodithioic acids can also be prepared by heating and reacting an aromatic compound with a phosphorus sulfide in the presence of an aluminum halide as described in U.S. Patent No. 2,797,238.

The preparation of alkyl aryl phosphinodithioic acids is accomplished by the reaction of an alkyl thionophosphine sulfide with an aromatic compound in the presence of aluminum chloride as described by Newallis et al. in volume 27, Journal of Organic Chemistry, page 3829. For example, phenyl-methyl phosphinodithioic acid is easily prepared by the reaction of methylthionophosphine sulfide with benzene in the presence of aluminum chloride.

The organic phosphinomonothioic acids can be prepared by the controlled hydrolysis of the corresponding phosphinodithioic acids.

The aluminum halides include aluminum chloride, aluminum bromide, aluminum fluoride, and aluminum iodide, although aluminum chloride is preferred for economy and ease of handling.

The aluminum halide complex of (a) can be prepared in a number of ways. Ordinarily, the di-aromatic prosphinodithioic acids are prepared by the reaction of an aromatic compound with phosphorus pentasulfide and an aluminum halide. The molar ratio of aluminum halide to phosphorus pentasulfide should not be greater than 4:1. This upper limit is predicated on the discovery that the presence of greater amounts of aluminum halide results in the further reaction of the complex with the aromatic compound and the formation of the tri-aryl phosphine sulfide. Thus, when such an excess of aluminum halide is used to prepare reactant (a), reactant (a) is not isolated. If this reactant is not isolated, the unsymmetrical phosphine sulfides described hereafter cannot be produced.

The reactants are mixed and heated at reflux temperature for 8 to 10 hours. Filtration and removal of the excess aromatic hydrocarbon results in the isolation of the aluminum halide complex of the phosphinodithioic acid. The aluminum halide-phosphinodithioic acid molar ratio in these complexes can vary from 1:1 to 2:1 depending on the aluminum halide-aromatic compound ratio in the preparatory step. The aluminum halide complexes of phosphinodithioic acids prepared by other methods can be formed by addition of one to two moles of the aluminum halide per mole of phosphinodithioic acid followed by heating at 100° C. for 1 to 2 hours. Examples of aluminum halide complexes prepared in this manner are the aluminum halide complexes of the phosphinodithioic acids prepared through the Grignard procedure, and the phosphinomonothioic acids prepared by the controlled hydrolysis of the phosphinodithioic acids.

Examples of the aromatic compounds (ArH) which are useful as reactant (b) in the process of the invention are organic compounds containing at least one resonant ring structure which is free of reactive functional groups such as hydroxyl and amino, and having an ionization constant of less than $1 \times 10^{-10}$ at 25° C. in aqueous solution. The aromatic compounds of (b) may contain polar groups provided that the polar groups are not present in proportions sufficiently large to alter significantly the character and the ionization constant of the aromatic compound. The polar groups are exemplified by the chloro, bromo, keto, ether, etc. groups. Examples of such compounds are benzene, biphenyl, naphthalene, diphenyl ether, and the substitution products of these such as their alkylation products, halogenation products, nitration products, etc. Examples of the alkylation products include toluene, xylene, diethylbenzene, n-butyl benzene, tertiary-butyl benzene, cetyl benzene, paraffin was-substituted benzene, dodecyl benzene, etc. Examples of the halogenation products include chlorobenzene, dichlorobenzene, bromobenzene, mono-chloroanthracene, ethyl-chlorobenzene, etc. Although any of the above aromatic compounds may be reacted with the phosphorus reactant, aromatic compounds containing one resonant ring structure are preferred for reasons of economy and ease of handling.

The reaction of the aluminum halide complex (a) with aromatic compounds (ArH) is illustrated below (reacton A) wherein $n$, R, R', X and Z are as previously defined.

(A)

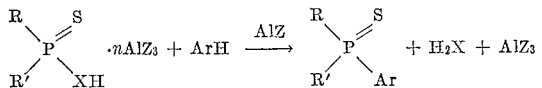

Thus, the reaction of an aromatic compound with the aluminum halide complex of a phosphinodithioic acid produces a phosphine sulfide. The phosphine sulfides prepared by reaction (A) may be either symmetrical or unsymmetrical depending on the choice of reagents. For example, symmetrical triaryl phosphine sulfides may be prepared by the process of this invention when R, R', and Ar are identical radicals, e.g., phenyl. However, the particular utility of the process of this invention is in the preparation of unsymmetrical phosphine sulfides since these may be prepared in a pure state. The unsymmetrical products are prepared when R, R' and Ar are different radicals.

For example, the reaction of the aluminum halide complex of a dialkyl phosphinodithioic acid with benzene in the presence of additional aluminum halide produces a dialkyl phenyl phosphine sulfide, and the reaction of the aluminum halide complex of diphenyl phosphinodithioic acid with chlorobenzene in the presence of additional aluminum halide produces diphenyl (chlorophenyl) phosphine sulfide. The same reactions on the corresponding phosphinomonothioic acids produce dialkyl phenyl phosphine sulfide and diphenyl (chlorophenyl) phosphine sulfide respectively.

Examples of symmetrical triaryl phosphine sulfides prepared by the process of this invention include triphenylphosphine sulfide, tritolylphosphine sulfide, and tri-(chlorophenyl)phosphine sulfide.

Examples of unsymmetrical phosphine sulfides prepared by the process of this invention include diethyl phenyl phosphine sulfide, diphenyl chlorophenyl phosphine sulfide, dihexyl xylyl phosphine sulfide, ditolyl chlorophenyl phosphine sulfide, di-(chlorophenyl)phenyl phosphine sulfide, di-(diethyl phenyl) tolyl phosphine sulfide, di-(ethyl-chlorophenyl) xylyl phosphine sulfide, di-(methyl-chlorophenyl) phenyl phosphine sulfide, di-(dodecylphenyl) ethylchlorophenyl phosphine sulfide, diphenyl para-phenoxyphenyl phosphine sulfide, ditolyl biphenylyl phosphine sulfide, and phenyl isopropyl tolyl phosphine sulfide.

The reaction of aluminum halide complexes of phosphinomonothioic acids with aromatic compounds (b) in the presence of additional aluminum halide produces the corresponding phosphine sulfide since the reactants react with the elimination of water as illustrated in reaction (B)

(B)

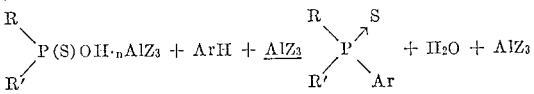

For example, the aluminum halide complex of diphenyl phosphinomonothioic acid with benzene in the presence of additional aluminum halide produces triphenylphosphine sulfide exclusively. Examples of phosphine sulfides prepared by reacting the aluminum halide complex of phosphinomonothioic acids with aromatic compounds include diphenyl tolyl phosphine sulfide, diphenyl chlorophenyl phosphine sulfide, diethyl phenyl phosphine sulfide, di-cyclohexyl phenyl phospine sulfide, triphenyl phosphine sulfide, di-(chlorophenyl) tolyl phosphine sulfide, and phenyl isopropyl tolyl phosphine sulfide.

The temperature of the reaction may be as low as 50° C., and in some cases, may be as high as 200° C. Generally, the reaction is carried out at the reflux temperature of the aromatic component (b).

The time required for the reactions to proceed by the process of this invention varies throughout a wide range, depending upon the reactivity of the reactants, the temperature of the reaction mixture, and the amount of additional aluminum halide added to the mixture. Generally, the reaction time of from about 1 to 15 hours is sufficient, but in some instances the reaction mixture may be heated for 20 hours or more to insure completion of the reaction. Those reactions which are substantially complete within a short period of time are not adversely affected if heating is continued for a longer period. Furthermore, the process of this invention may be carried out at superatmospheric pressures and at correspondingly higher reaction temperatures to give good yields of products in shorter periods of time than would otherwise be required.

The process of this invention is carried out by heating a mixture of the phosphorus-containing reactant (a), aromatic reactant (b), and additional aluminum halide as illustrated in the examples below. Any of the aluminum halides described previously may be utilized for this purpose. Thus, the reaction of the aluminum chloride complex of a phosphinodithioic acid with an aromatic compound may be catalyzed by aluminum bromide, aluminum fluoride, aluminum iodide, or aluminum chloride. Stoichiometrically, the molar ratio of phosphorus-containing reactant (a) to the aromatic reactant (b) is not critical since some of the desired product will be obtained when any amounts of the two reactants are brought into contact in the presence of the catalyst. However, it is generally desirable to use a slight excess of aromatic reactant (b) to insure completion of the reaction. The amount of aluminum halide which is added as catalyst is not critical and amounts ranging from 0.02 to 2 moles of aluminum halide per mole of the aluminum halide complex (a) have been found to be sufficient. If, however, additional aluminum halide is not added to the reaction mixture of components (a) and (b), no reaction takes place between the two components. It is therefore essential to the process of this invention that some aluminum halide be added to the mixture of phosphorus-containing reactant (a) and the aromatic component (b) if the desired process is to be obtained.

Although the aluminum halide complex of (a) is generally formed before reactant (b) is added, it is also possible to form the complex in situ. Thus, the process of this invention may be brought about by mixing the phosphorus-containing reactant with reactant (b) and a larger amount of aluminum halide, e.g., three moles of aluminum halide per mole of phosphorus reactant, and heating the mixture to bring about the desired reaction.

Upon completion of the reaction, the reaction mixture is poured into water which may be slightly acidic. In this manner, the aluminum halide is removed and the product may be isolated free from aluminum halide either by filtration, or by extraction with a suitable solvent. Any unreacted phosphorus acid is removed by washing with a basic aqueous solution.

If the reaction mixtures as described above lack sufficient fluidity to allow for proper mixing, it may be desirable to add additional amounts of reactant (b) as a solvent. If desired, the excess amount of reactant can be recovered subsequently. In general, however, fluidity is not a problem at the reaction temperature.

The following examples illustrate the process of this invention: (parts are by weight unless otherwise specified).

*Example 1*

A mixture of 900 grams (11.5 moles) of benzene, 320 grams (1.44 moles) of phosphorus pentasulfide and 386 grams (2.9 moles) of aluminum chloride is heated at the reflux temperature for 8 hours and then allowed to cool to room temperature. The mixture is filtered and the excess benzene removed from the filtrate by distillation. The residue is the aluminum chloride complex of diphenylphosphinodithioic acid having an aluminum choride to acid ratio of 1.1 to 1.

*Example 2*

The aluminum chloride complex of di-(chlorophenyl)-phosphinodithioic acid having an aluminum chloride to acid ratio of 1.1 to 1 is prepared by the procedure of Example 1 by the reaction of 890 grams (4 moles) of phosphorus pentasulfide, 2500 grams (22.3 moles) of chlorobenzene and 1170 grams (8.8 moles) of aluminum chloride.

*Example 3*

To 288 grams (0.73 mole) of the product of Example 1, there is added 133 grams (1.0 mole) of aluminum chloride and 100 grams (1.09 moles) of toluene. The mixture is heated at 130–140° C. for 14 hours, cooled and poured into ice-water. The product is extracted with 400 ml. of benzene and dried with magnesium sulfate. The benzene is evaporated by distillation at 120–130° C./20–25 mm. The product is diphenyl (p-methylphenyl)phosphine sulfide having a phosphorus content of 10.1% (theory 10.0%) and a sulfur content of 10.7% (theory 10.4%).

*Example 4*

A mixture of 900 grams (11.5 moles) of benzene, 320 grams (1.44 moles) of phosphorus pentasulfide and 772 grams (5.78 moles) of aluminum chloride is heated at the reflux temperature for 11 hours and filtered to remove the remaining solid. Benzene is removed from the filtrate by heating to 100° C./10–20 mm. over a period of 5 hours. The residue is the aluminum chloride complex of diphenyl phosphinodithioic acid having an aluminum chloride to acid ratio of 2 to 1. To 322 grams (0.607 mole) of this complex is added 41.6 grams (0.312 mole) of aluminum chloride and 112 grams (1.0 mole) of chlorobenzene. The mixture is heated at 120° C. for approximately 20 hours and poured into ice-water. The product is extracted with benzene, washed with a dilute aqueous solution of sodium hydroxide, washed with water, and dried over magnesium sulfate. The benzene and unreacted chlorobenzene are removed by heating to 150° C./20 mm. The residue is the product, diphenyl (chlorophenyl)phosphine sulfide, having a phosphorus content of 10.0% and a sulfur content of 11.5%.

*Example 5*

The aluminum chloride complex of ditolylphosphinodithioic acid is prepared by the procedure of Example 2 except that chlorobenzene is replaced on a molar basis, by toluene. To 800 grams (1.84 moles) of this aluminum chloride complex, there is added 308 grams (2 moles) of biphenyl and the mixture is heated at 70° C. for 8 hours. To this mixture is added 320 grams (2.4 moles) of aluminum chloride and the mixture is heated at 130–150° C. for 8 hours and then at 150–160° C. for 8 additional hours. The residue is cooled at 50° C. and poured into ice-water. The product is extracted with benzene, and the benzene solution heated for 20 hours with 150 grams of a 50% aqueous solution of sodium hydroxide contained in 200 ml. of water. The product is then diluted with 500 ml. of water and extracted with benzene. The benzene solution is dried with magnesium sulfate, filtered, and heated to 200° C./0.25 mm. to remove the benzene and unreacted biphenyl. The residue is the product having a phosphorus content of 7.75% and a sulfur content of 8.80%.

*Example 6*

To 1011 grams (2.5 moles) of the aluminum chloride complex prepared as in Example 1, there is added 677 grams (2.75 moles) of dodecyl benzene and 200 grams of aluminum chloride. The mixture is heated to 80° C. and an additional 200 grams of aluminum chloride is added and the temperature raised at 100–110° C. for 19 hours. The cooled reaction mixture is then poured into ice-water and the product extracted with benzene, washed with water and dried with magnesium sulfate. The benzene is removed by distillation and the residue is heated on a steam bath with 125 grams of a 50% aqueous solution of sodium hydroxide diluted with 500 mls. of water for 16 hours and then extracted with benzene. The benzene solution is washed with water 3 times, and dried with magnesium sulfate. The solution is filtered and the benzene removed by distillation at 120° C./10–15 mm. The residue is the product and has a phosphorus content of 5.43% and a sulfur content of 6.74%.

*Example 7*

A mixture of 288 grams (0.705 mole) of the product of Example 1 and 38 grams (0.29 mole) of aluminum chloride is heated at 50° C. and 185 grams (1.09 mole) of diphenyl oxide is added rapidly with additional heating. The mixture is heated to 150° C. for 18 hours, cooled to room temperature, and poured into ice-water. The water is removed by decantation and the residue heated with 60 grams of sodium hydroxide in 800 ml. of water on a steam bath for 6 hours. The layers are then separated and the organic layer washed with water and dried with magnesium sulfate. The product is filtered and heated to 170° C./1 mm. to remove the volatile materials. The residue is then heated to 0.25 mm. and the product, diphenyl (phenoxyphenyl)phosphine sulfide distills at 240–5° C. having a phosphorus content of 7.65% (theory: 8.02) and a sulfur content of 8.51% (theory, 8.27%).

*Example 8*

A mixture of 900 grams (11.5 moles) of benzene, 640 grams (2.88 moles) of phosphorus pentasulfide and 1540 grams (5.78 moles) of aluminum bromide is heated at the reflux temperature for 10 hours and filtered to remove the remaining solid. The excess benzene is removed from the filtrate by heating at 100° C./10 mm. for 5 hours. The residue is the aluminum bromide complex of diphenylphosphinodithioic acid. To 402 grams (0.607 mole) of this complex is added 82 grams (0.312 mole) of aluminum bromide and 78 grams (1.0 mole) of benzene. The mixture is heated at 80° C. for approximately 15 hours and poured into ice-water. The product is extracted with benzene, washed with a dilute aqueous solution of sodium hydroxide, washed with water, and dried over magnesium sulfate. The unreacted benzene is removed by heating to 150° C./20 mm. The residue is the product, triphenylphosphine sulfide.

*Example 9*

To 500 grams of diphenylphosphinodithioic acid which is heated to 75–80° C., there is added 36 grams (2 moles) of water over a 1 hour period. The mixture is heated at 100° C. for 3 hours and then blown with nitrogen at this temperature to remove the remaining hydrogen sulfide and water. The diphenylphosphinomonothioic acid is dried further by heating at 100° C./22 mm. To this residue is added 400 grams (3.0 moles) of aluminum chloride and 200 grams (1.2 moles) of toluene. The mixture is heated at 130–140° C. for 14 hours, cooled and poured into ice-water. The product is extracted with 400 ml. of benzene and dried with magnesium sulfate. The benzene is evaporated by distillation at 120–130° C./20–25 mm. The residue is the product, diphenyl (para-methylphenyl)phosphine sulfide.

*Example 10*

A mixture of 450 grams (5.8 moles) of benzene, 655 grams (5.8 moles) of chlorobenzene, 320 grams (1.44 moles) of phosphorus pentasulfide and 400 grams (3 moles) of aluminum chloride is heated to reflux for 8 hours and then allowed to cool to room temperature. The mixture is filtered and the excess benzene and chlorobenzene removed from the filtrate by distillation.

To 300 grams of this aluminum chloride complex, there is added 133 grams (1.0 mole) of aluminum chloride and 100 grams (1.09 moles) of toluene. The mixture is heated at 130–140° C. for 10 hours, cooled and poured into ice-water. The product is extracted with 400 ml. of benzene and dried over magnesium sulfate. Benzene and toluene are removed by distillation at 120–130° C./40 mm. leaving the product as the residue.

*Example 11*

A mixture of 173 grams (1.0 mole) of diethylphosphinodithioic acid, 88 grams (1.1 mole) of benzene and 600 grams (4.5 moles) of aluminum chloride is heated at 100° C. for 10 hours, the reaction mixture is cooled to 30° C. and poured into two liters of ice-water. The product is extracted with one liter of benzene and dried over magnesium sulfate. The benzene is then removed by distillation at 120–130° C./100 mm. leaving a residue which is phenyl diethylphosphine sulfide.

*Example 12*

To 551 grams (1.1 moles) of the product of Example 2, there is added 94 grams (1.2 moles) of benzene and 160 grams (1.2 moles) of aluminum chloride, and the mixture is heated at reflux for 8 hours. The mixture is cooled to 50° C. and poured into ice-water. The product is extracted with benzene, washed with the dilute aqueous solution of sodium hydroxide, washed with water, and dried over magnesium sulfate. The unreacted benzene is removed by heating to 150° C./20 mm. The residue is the product, di-(chlorophenyl) phenyl phosphine sulfide.

*Example 13*

To 335 parts (1.0 mole) of an aluminum chloride complex of phenylmethyl phosphinodithioic acid having an aluminum chloride to acid ratio of 1.1:1, there is added 94 parts (1.2 moles) of benzene and 146 parts (1.1 moles) of aluminum chloride. The mixture is heated at 120° C. for approximately 15 hours and poured into ice-water. The product is extracted with benzene, washed with a dilute aqueous solution of sodium hydroxide, washed with water, and dried over magnesium sulfate. The unreacted benzene is removed by heating to 150° C./20 mm. The residue is the desired product.

*Example 14*

The procedure of Example 13 is repeated except that 364 parts of the aluminum chloride complex of phenyl-isopropyl-phosphinodithioic acid is used in lieu of the phenyl-methylphosphinodithioic acid complex.

*Example 15*

The procedure of Example 13 is repeated except that 364 parts of the aluminum chloride complex of phenyl isopropyl phosphinodithioic acid is used in place of the aluminum chloride complex of phenyl-methyl-phosphinodithioic acid and 110 parts of toluene is used in place of the benzene.

*Example 16*

The procedure of Example 13 is repeated except that 486 parts (1 mole) of the aluminum bromide complex of phenyl-isopropyl-phosphinomono-thioic acid having an aluminum bromide to acid ratio of 1.1:1 is used in lieu of the aluminum cholride complex of phenyl-methyl-phosphinodithioic acid. The product of this reaction is diphoneyl-isopropyl-phosphine sulfide.

*Example 17*

To 288 grams (0.73 mole) of the product of Example 1, there is added 133 grams (1.0 mole) of aluminum chloride and 94 grams (1.2 moles) of benzene. The mixture is heated at 130° C. for 15 hours, cooled, and poured into ice-water. The product is extracted with benzene and dried with magnesium sulfate. The benzene is evaporated by distillation at 100°–120° C./25 mm. The product is triphenylphosphine sulfide.

*Example 18*

A mixture of 342 parts (15 moles) of diphenylphosphinomonothioic acid, prepared by the hydrolysis of the corresponding dithioic acid and 600 parts of toluene is heated to 60° C. whereupon 266 parts (2.0 moles of aluminum chloride is added over a period of one hour. The mixture is heated at 118° C. for four hours and the excess toluene is removed by heating at 150° C. over a 6 hour period. The residue is hydrolyzed by the addition of 500 parts of water and 1000 parts of benzene is added. The aqueous layer is removed. The benzene solution is then saponified with 800 parts of a 10% aqueous sodium hydroxide solution. The benzene layer is separated, dried, and the benzene removed by distillation. The product is isolated by further distillation of the residue at 200°–220° C./0.5 mm. The distillate is solidified by crystallization from n-heptane. The crystals are the desired product, diphenyl tolyl phosphine sulfide having a phosphorus content of 10.0% (theory 10.1%) and a sulfur content of 10.63% (theory 10.4%).

The phosphorus compounds prepared by the process of this invention can be employed as improving agents in lubricating oils and greases, and particularly for such purposes as producing an improved lubricant for use in crankcases of internal combustion engines, jet aviation engines, steam cylinders, steam locomotives, gas engines, and hydraulic compressors, turbine, spindle, and torque converter mechanisms. Other suitable uses are in asphalt emulsions, insecticidal compositions, fire-proofing and stabilizing agents and plasticizers and plastics, paint driers, cutting oils, metal drawing compositions, flushing oils, emulsifying agents, penetrating agents, gum solvent compositions, and improving agents for hydrocarbon fuels.

What is claimed is:
1. A process for preparing organophosphorus sulfides comprising reacting at a temperature within the range from about 50° C. to about 200° C.,

(a) a phosphorus-containing reactant having the formula

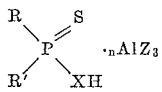

wherein:
X is selected from the class consisting of oxygen and sulfur
$n$ is a number from 1 to 2,
Z is a halogen, and
R and R' are hydrocarbon radicals, with
(b) an aromatic compound having an ionization constant of less than $1 \times 10^{-10}$ at 25° C. in aqueous solution, in the presence of
(c) $AlZ_3$ wherein Z is as defined above.

2. The process of claim 1 characterized further in that Z is chlorine.

3. The process of claim 1 characterized further in that R and R' are aromatic radicals.

4. The process of claim 1 characterized further in that X is oxygen.

5. A process for preparing organophosphorus sulfides comprising reacting at a temperature within the range from about 50° C. to about 200° C.,
(a) a phosphorus-containing reactant having the formula

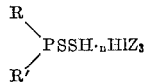

wherein:
$n$ is a number from 1 to 2,
Z is a halogen, and
R and R' are hydrocarbon radicals, with
(b) an aromatic compound having an ionization constant of less than $1 \times 10^{-10}$ at 25° C. aqueous solution, in the presence of
(c) $AlZ_3$ wherein Z is as defined above.

6. The process of claim 5 characterized further in that Z is chlorine.

7. The process of claim 5 characterized further in that R and R' are aromatic radicals.

8. The process of claim 7 characterized further in that the aromatic radicals are alkaryl radicals.

9. The process of claim 7 characterized further in that the aromatic radicals are haloaryl radicals.

10. The process of claim 5 characterized further in that the aromatic compound of (b) is an alkaryl compound.

11. The process of claim 5 characterized further in that the substantially hydrocarbon aromatic compound of (b) is a haloaryl compound.

12. The process of preparing triphenylphosphine sulfide comprising reacting at a temperature within the range from about 50° to about 200° C.,
(a) a phosphorus-containing reactant having the formula

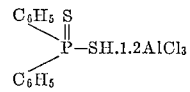

with
(b) benzene, and
(c) aluminum chloride in a molar ratio of 1:1.5:1.5.

13. The process of preparing diphenyl (para-methylphenyl)phosphine sulfide comprising reacting at a temperature within the range from about 50° to about 200° C.,
(a) a phosphorus-containing reactant having the formula

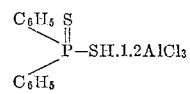

with
(b) toluene, and
(c) aluminum chloride in a molar ratio of 1:1.5:1.5.

References Cited by the Examiner
UNITED STATES PATENTS
3,105,097   9/1963   Willans _____ 260—606.5

HELEN M. McCARTHY, *Acting Primary Examiner.*
W. F. W. BELLAMY, *Assistant Examiner.*